(12) United States Patent
Hermans

(10) Patent No.: US 7,045,964 B1
(45) Date of Patent: May 16, 2006

(54) EMERGENCY LIGHTING SYSTEM WITH AUTOMATIC DIAGNOSTIC TEST

(76) Inventor: Albert L. Hermans, 2555 Nicholson St., San Leandro, CA (US) 94577-4216

( * ) Notice: Subject to any disclaimer, the term of this patent is extended or adjusted under 35 U.S.C. 154(b) by 50 days.

(21) Appl. No.: 10/757,654

(22) Filed: Jan. 13, 2004

(51) Int. Cl.
H05B 37/00 (2006.01)

(52) U.S. Cl. .................. 315/86; 315/160; 315/226; 315/360; 315/362; 307/64; 307/86

(58) Field of Classification Search .............. 315/86, 315/88, 909, 121, 160, 225, 161, 226, 360, 315/362, 312–315, 209 R; 307/39, 64, 66, 307/85–86; 362/20
See application file for complete search history.

(56) References Cited

U.S. PATENT DOCUMENTS

| 3,660,714 | A | * | 5/1972 | Chandler | 315/86 |
| 3,809,917 | A | * | 5/1974 | Vore | 307/39 |
| 4,486,689 | A | * | 12/1984 | Davis et al. | 315/92 |
| 4,600,972 | A | | 7/1986 | MacIntyre | |
| 4,686,424 | A | | 8/1987 | Nuckolls et al. | |
| 4,887,004 | A | | 12/1989 | Kraaij et al. | |
| 4,890,200 | A | * | 12/1989 | Mandy | 362/20 |
| 4,977,351 | A | * | 12/1990 | Bavaro et al. | 315/87 |
| 5,365,145 | A | * | 11/1994 | Fields | 315/86 |
| 5,416,384 | A | | 5/1995 | Bavaro | |
| 5,473,517 | A | | 12/1995 | Blackman | |
| 5,633,564 | A | | 5/1997 | Edwards et al. | |
| 5,713,655 | A | | 2/1998 | Blackman | |
| 5,814,971 | A | | 9/1998 | Johnson | |
| 5,833,350 | A | | 11/1998 | Moreland | |
| 5,910,689 | A | * | 6/1999 | Ertz et al. | 307/64 |
| 6,285,132 | B1 | | 9/2001 | Conley, III et al. | |
| 6,392,349 | B1 | | 5/2002 | Crenshaw | |
| 6,522,147 | B1 | | 2/2003 | Pickard et al. | |
| 6,577,136 | B1 | | 6/2003 | Marques | |
| 6,628,083 | B1 | * | 9/2003 | Pickering | 315/86 |

* cited by examiner

Primary Examiner—Haissa Philogene
(74) Attorney, Agent, or Firm—Harris Zimmerman

(57) ABSTRACT

An emergency lighting system powers all the luminaires of a lighting system during normal use, and switches from utility power to an emergency power source to drive some of the luminaires during a power outage. The typical on/off wall switch control for regular use carries out an automatic system test routine every time it is switched off. First, the non-emergency luminaires are extinguished, the emergency luminaires are activated for a time-limited period, and the system reverts to regular utility power and on/off control by the wall switch.

8 Claims, 3 Drawing Sheets

EMERGENCY LIGHTING SYSTEM WITH AUTOMATIC DIAGNOSTIC TEST

CROSS-REFERENCE TO RELATED APPLICATIONS

Not applicable

FEDERALLY SPONSORED RESEARCH

Not applicable.

SEQUENCE LISTING, ETC ON CD

Not applicable.

BACKGROUND OF THE INVENTION

1. Field of the Invention

This invention relates to emergency lighting systems that provide illumination for buildings and the like during power failure, using an emergency power source and selected fixtures or luminaires within a larger lighting system.

2. Description of Related Art

In the past, safety codes required that emergency luminaires that are powered by an emergency generator or inverter during a power outage must be illuminated 24 hours per day, 7 days per week, to give a continual indication of their readiness and operability. In recent times, the codes have been changed to permit the use of a power transfer control (listed under UL924 specs) to turn on and off both the regular and emergency luminaires at the same time. During a utility power failure or room power interruption, only the designated emergency luminaires are illuminated automatically, using the emergency power source, regardless of the on/off position of the room lighting switch.

This arrangement is more economical and convenient, but it does not provide the continuing assurance of emergency lighting readiness that was given by the older systems. As a result, it is necessary to provide a test feature and readiness indication for systems that use the power transfer control arrangement. Generally, this requirement is met by turning off the lighting branch circuit breaker that serves a particular area, which in turn automatically transfers the emergency light fixtures in that area to an emergency power source. This test routine involves visiting each lighting panel, and is time consuming.

Intelligent building operating systems may incorporate sensors and subroutines to survey the emergency lighting systems in a building, and report problems or failures. These systems, however, may not fulfill code requirements for personal inspection of the systems and the individual responsibility it conveys. Nor do they provide the conclusive determination of eyewitness observation of proper testing of an emergency lighting system.

BRIEF SUMMARY OF THE INVENTION

The present invention generally comprises an emergency lighting system that employs a power control transfer switch to power all the luminaires of a lighting system during normal use, and to switch to an emergency power source and power some of the luminaires during a power outage. A salient feature of the invention is that the wall switch that controls the luminaires for regular use also serves to carry out an automatic system test routine every time it is used by the room or building occupants. This aspect of the invention may be applied to common lighting system connection schemes.

Whenever the wall switch is turned off, the invention performs a quick test of the emergency lighting system. First, the regular (non-emergency luminaires) are extinguished, and the emergency luminaires are activated for a time-limited period. After a few seconds, the emergency luminaires are then extinguished, and the system is off. During the brief operation of the emergency luminaires, it is easy to observe that: 1) emergency power is available to the emergency lighting system; and, 2) the emergency luminaires are functioning properly. It is significant to note that this test is carried out whenever the wall switch is turned off, so that the testing procedure becomes a routine aspect of the use of the lighting system. Thus the system is tested on a continuing basis, leading to a greater awareness of the emergency lighting system and its ready status.

The automatic test feature also provides a serendipitous benefit, in that it illuminates the room or area for a brief period after the switch is turned off, during which time the occupants may leave the room or area before total darkness ensues. In many situations this added benefit may provide enhanced safety during egress.

The electronic assembly of the invention may be mounted directly behind the wall switch within the same box, or it may be mounted in a luminaire or in any wall or ceiling mounted junction box. No matter where it is mounted, the automatic test feature is continuously available. Unlike prior art emergency lighting systems, it is not necessary to gain access to the circuit breaker panel in order to perform a test routine, so that the emergency lighting system may be tested with no disruption to other activities carried out in the lighted space.

DETAILED DESCRIPTION OF THE INVENTION

The present invention generally comprises an emergency lighting system that employs a power control transfer switch to deliver regular utility power to all the luminaires of a lighting system during normal use, and to switch to an emergency power source and power at least some of the luminaires during a power outage. A significant feature of the invention is that the wall switch that controls the luminaires for regular (everyday) use also serves to carry out an automatic system test routine every time it is used by the room or building occupants. That is, whenever the lights are switched off while being driven in usual fashion by regular utility power, the designated emergency luminaires are lighted for a brief period, on the order of 15 seconds. Thus the occupants are apprised of the operability of the emergency luminaires, and the fact that the emergency power source (generator, battery, etc.) is properly available to drive the emergency luminaires.

Figure 1:
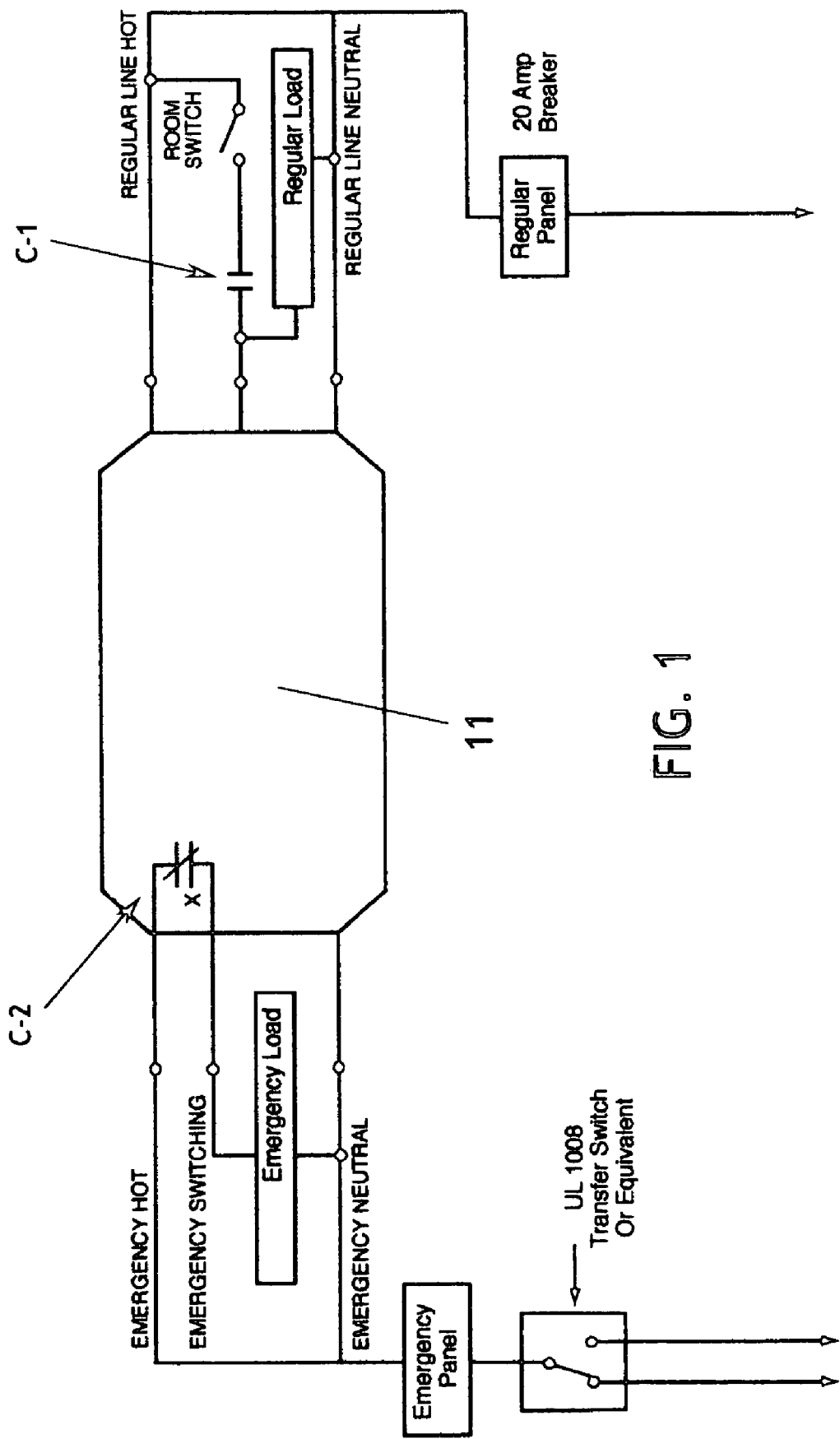
FIG. 1 is a block diagram of the connections to the emergency lighting system with automatic diagnostic testing of the present invention.

With regard to FIG. 1, the emergency lighting system of the invention includes an electronic assembly 11 that is connected to the regular utility power system, including the hot and neutral lines as well as a switched line operated by a room switch. Note that the regular load, such as one or more luminaires used to light a room or space, is connected from the switch leg to the neutral leg of the regular power system. Also, it may be appreciated that the switch leg may alternatively include an occupancy system (here shown as normally open contacts C-1) or other similar control features known in the prior art. The assembly 11 is also connected to an emergency power system through a transfer switch operating in accordance with UL 1008 specs or the equivalent. The emergency power system includes hot and neutral legs, with an emergency load connected therebetween that comprises one or more of the luminaires in the system.

During normal operation of the luminaires in the lighting system, the regular hot leg provides the operating voltage to the assembly, and the regular neutral leg is ground. When the regular operating voltage is interrupted or otherwise fails, the regular luminaires go off and relay contacts C-2 close. The emergency luminaire is thus connected between emergency hot and neutral legs, and is operated at full brightness, despite the fact that it may have been in a switched off condition prior to emergency power being switched on.

When regular power is restored and the regular hot leg is once again carrying the proper operating voltage, the relay contacts revert to the normal operating configuration and regular system power is supplied to the regular and emergency luminaires. Thus emergency power is switched into the designated emergency lighting whenever regular power is interrupted, and no maintenance work is required to reset the system.

A further significant aspect of the invention is the provision of an automatic test feature to assess the readiness of the emergency lighting luminaires and the emergency power supply. The test routine is operated automatically whenever the lighting system in regular operating mode is switched off, using the same wall switch (for room or area lamps) or the like that is normally used to turn the lighting system on and off. That is, whenever the regular on-off switch is turned off, the system switches to emergency test mode, and emergency power is supplied to the emergency luminaires while the regular luminaires are turned off. This arrangement enables anyone to determine that the emergency fixtures are operational, and that emergency power is online and available.

The test phase is limited to a brief time period, on the order of 15–30 seconds, after which the emergency luminaire(s) are extinguished and the system reverts to normal operation on regular utility power. The test also provides lighting during egress, in that when the lights are switched off the room or area will not be subject to immediate and total darkness; rather, the emergency fixtures will give more that adequate illumination for safe exit of the area.

Figure 2:
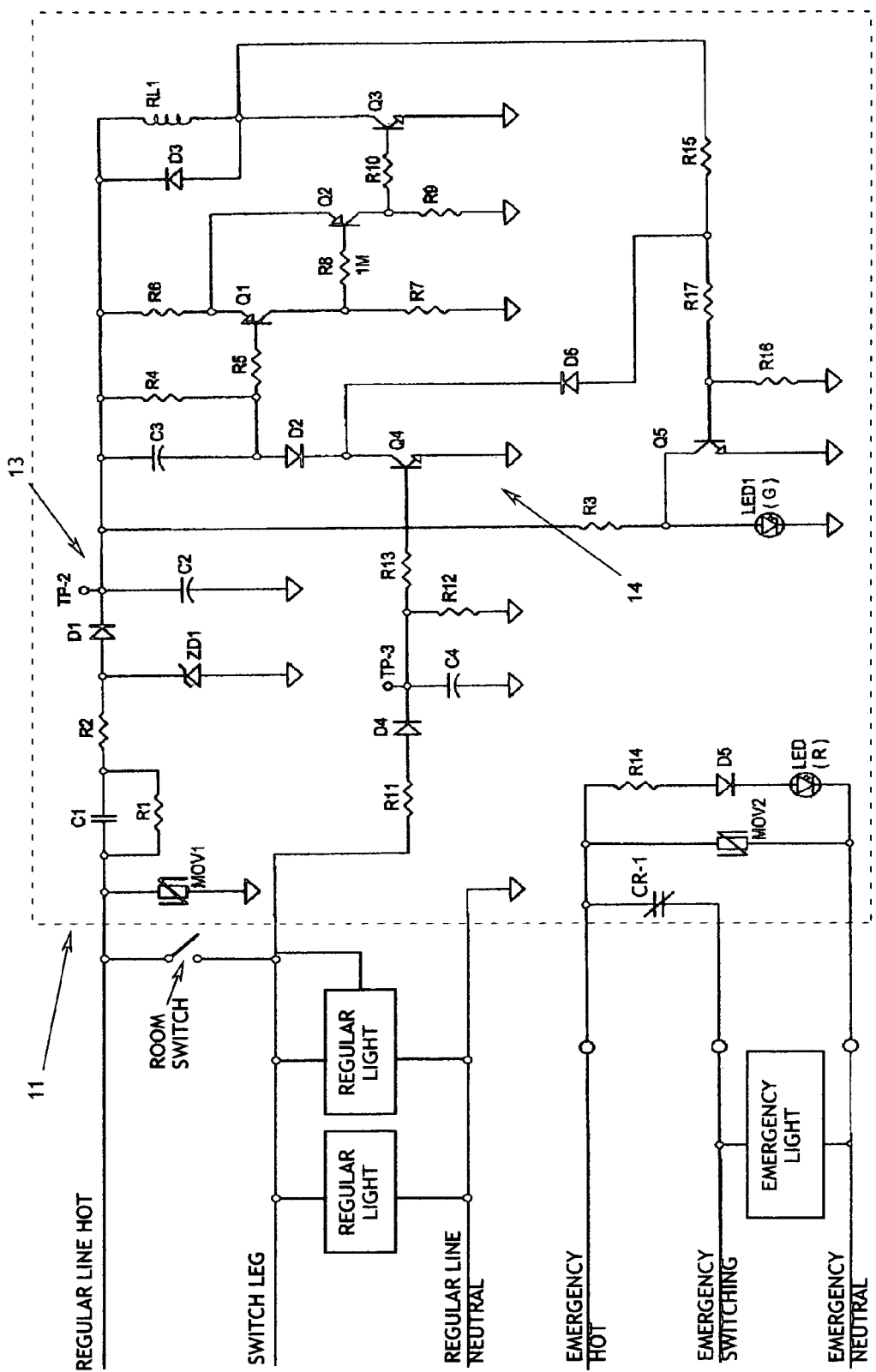
FIG. 2 is a schematic of an embodiment of a circuit for carrying out the emergency power switching and automatic diagnostic testing functions of the present invention.

One example of a circuit arrangement for providing the automatic test feature is embodied in the circuit 11 of FIG. 2, although modifications and other circuits may be devised to provide this function. When the room switch is on, capacitor C4 is charged, transistor Q4 is on, and capacitor C3 is charged. Transistor Q1 is turned on, and transistors Q2 and Q3 are off. Q3 off determines that relay coil RL1 is off, so that the normally closed relay contacts CR1 remain closed, and emergency power is delivered to the emergency light (in addition to the regular lights being powered by the closed room switch).

When the room switch is turned off, transistor Q4 goes off, and C3 discharges through R4 to create a time delay of approximately 15 seconds. Then, transistor Q1 goes off, which switches Q2 and Q3 on, thus energizing relay coil RL1. This action opens the normally closed relay contacts CR1, which turns off the emergency light (after the time delay). During the time delay period, Q4 and Q3 are off and Q5 is on, and LED1 is off. After the time delay period, Q3 goes on, Q5 turns off, and LED1 is illuminated.

Also, note that because the automatic diagnostic test feature of the invention provides an ongoing, frequent testing and affirmation of the emergency lighting system, it is generally not necessary to observe the indicators such as LED1 and LED2.

Figures 3, 4, 5:
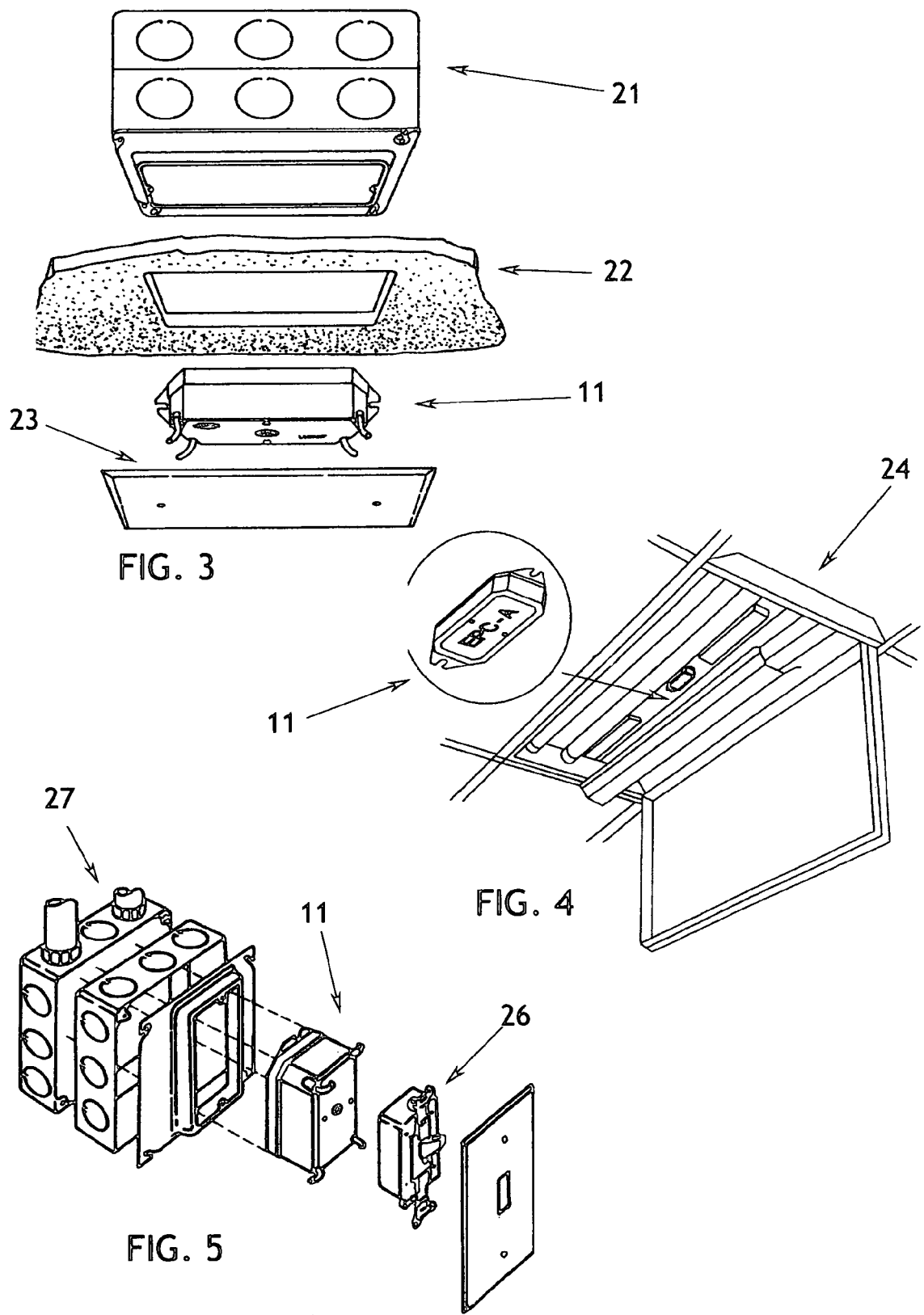
FIG. 3 is an exploded view showing the apparatus of the invention installed in a ceiling junction box.
FIG. 4 is a perspective view showing the apparatus of the invention installed in a luminaire.
FIG. 5 is an exploded view showing the apparatus of the invention installed in a wall switch junction box.

The automatic diagnostic test feature of the invention also greatly broadens the opportunities for installation of the assembly 11 described previously. Due to the fact that the regular on/off switch provides the test function, the assembly 11 may be mounted in a ceiling 22 in a junction box 21 sealed by a cover plate 23 (FIG. 4), providing of course that all proper wiring connections are made to the luminaires or fixtures, the wall switch, and the regular and emergency power sources, as described above and shown in the previous figures. Likewise, the assembly 11 may be mounted in a ceiling fixture or luminaire 24 (FIG. 5), which may be one of the plurality of fixtures that are powered by the lighting system. The device 11 is sufficiently compact that it may even be installed within the junction box 27 that houses the on/off wall switch 26, as shown in FIG. 6. In all these installations the device 11 may not be readily available for visualization, but the automatic diagnostic function utilizing the wall switch and emergency luminaires fulfills all necessary test functions for the emergency system.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. An emergency lighting system for powering at least one lighting fixture with regular utility power and at least one emergency lighting fixture when regular utility power is interrupted, including:

relay contact means for connecting emergency operating power to the at least one emergency lighting fixture in response to power failure in the regular utility power;

said regular utility power including a switch leg connected to the at least one lighting fixture, and further including means for detecting a transition from a switched on to a switched off condition on said switch leg and in response actuating said relay contact means to disconnect the regular utility power from the at least one emergency lighting fixture, and connect said emergency power source to the at least one emergency lighting fixture for a brief test period.

2. The emergency lighting system of claim 1, further including wall switch means connected between a hot leg of the regular utility power and said switch leg to control the switched on and switched off condition of said switch leg.

3. The emergency lighting system of claim 2, wherein after said brief test period said relay contact means reconnect the regular utility power to be available to the at least one regular lighting fixture and disconnect said emergency power source to the at least one emergency lighting fixture, whereafter the system is returned to operating on regular utility power in a switched off condition.

4. The emergency lighting system of claim 1, further including an electronic assembly for combining and supporting said means for detecting a transition, and said relay contact means, and said sensing means.

5. The emergency lighting system of claim 4, wherein said electronic assembly is installable in one of said at least one lighting fixtures.

6. The emergency lighting system of claim 4, wherein said electronic assembly is installable in a typical junction box.

7. The emergency lighting system of claim 2, further including an electronic assembly for combining and supporting said means for detecting a transition, and said relay contact means, said electronic assembly being installable in a junction box housing said wall switch means.

8. The emergency lighting system of claim 1, wherein said relay contact means comprises normally closed relay contacts connected between an emergency hot supply and an emergency switching leg connected to the at least one emergency lighting fixture.

* * * * *